(12) United States Patent
Chen et al.

(10) Patent No.: US 7,886,169 B2
(45) Date of Patent: Feb. 8, 2011

(54) APPARATUS AND METHOD FOR DYNAMIC BACKLIGHT-CONTROL ACCORDING TO BATTERY LEVEL AND IMAGE-CONTENT LIGHTNESS

(75) Inventors: Shing-Chia Chen, Sinshih Township, Tainan County (TW); Ling-Hsiu Huang, Sinshih Township, Tainan County (TW); Lin-Kai Bu, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 739 days.

(21) Appl. No.: 11/898,327

(22) Filed: Sep. 11, 2007

(65) Prior Publication Data

US 2009/0070606 A1    Mar. 12, 2009

(51) Int. Cl.
G06F 1/32         (2006.01)

(52) U.S. Cl. .................. 713/320; 345/102; 455/574

(58) Field of Classification Search ............... 713/320; 345/102; 455/574
See application file for complete search history.

(56) References Cited

U.S. PATENT DOCUMENTS

| | | | | |
|---|---|---|---|---|
| 6,738,649 | B2* | 5/2004 | Suzuki | 455/574 |
| 7,119,786 | B2* | 10/2006 | Cui | 345/102 |
| 2006/0209005 | A1* | 9/2006 | Pedram et al. | 345/102 |
| 2007/0097069 | A1* | 5/2007 | Kurokawa et al. | 345/102 |

* cited by examiner

Primary Examiner—Albert Wang
(74) Attorney, Agent, or Firm—Rabin & Berdo, P.C.

(57) ABSTRACT

An apparatus and a method for dynamic backlight-control in an electronic device are provided. The apparatus includes a battery power-level detection unit and a controlling unit. The battery power-level detection unit is used for detecting the power level of a battery in the electronic device. The controlling unit is coupled to a backlight unit of a display device in the electronic device and the battery power-level detection unit for adjusting the illumination of the backlight unit according to the power level of the battery and an image-content lightness of an image inputted into the display device.

8 Claims, 3 Drawing Sheets

APPARATUS AND METHOD FOR DYNAMIC BACKLIGHT-CONTROL ACCORDING TO BATTERY LEVEL AND IMAGE-CONTENT LIGHTNESS

BACKGROUND OF THE INVENTION

1. Field of the Invention

The invention relates in general to an electronic device, and more particularly to an electronic device with dynamic backlight-control function.

2. Description of the Related Art

Nowadays, with the advancement of technology, the popularity and the affordability of electronic products such as personal digital assistants (PDA), cell phones, digital cameras, etc. has increased more than ever. All technological companies that develop, manufacture and sell these electronic products are willing to provide users with electronic products that possess more functionalities and longer life spans.

Although the electronic products provide convenience to the users in their daily lives, problems remain with regard to their usage. All electronic products consume power regardless of whether they are in operational or stand-by mode. Moreover, during operation, some particular components in the electronic products require more power. When the charge of the batteries of the electronic products drains, it results in much inconvenience. Take a cell phone for example. The cell phone commonly has a liquid crystal display (LCD) that displaying different items of information. Since the LCD usually consumes considerable power, the power of the battery in the cell phone runs out quickly and easily.

If a user has to use the cell phone in an emergency, the cell phone may be switched off suddenly, or a phone call may be terminated immediately due to the power level of the battery in the cell phone is low. Such situations are annoying for the user.

SUMMARY OF THE INVENTION

The invention is directed to an apparatus and a method for dynamic backlight-control. By detecting the power level of a battery in the electronic device, the backlight unit of the electronic device is adjusted in order to reduce the power consumption of the battery.

According to the present invention, a method for dynamic backlight-control of a display device in an electronic device is provided. The method includes the steps as stated below. An image-content lightness of an image that is inputted into the display device is detected. A power level of a battery in the electronic device is detected. The illumination of a backlight unit in the electronic device is adjusted according to the image-content lightness of the image and the power level of the battery. The adjusting step includes determining the maximum and minimum illuminations of the backlight unit according to the power level of the battery and determining the illumination, which is between the maximum and minimum illumination according to the power level of the battery, for different image-content lightness. The range of the maximum and minimum illuminations of the backlight unit according to the power level of the battery overlaps with a range of maximum and minimum illuminations of the backlight unit according to the power level of a battery adjacent to the battery whose power level is detected.

According to the present invention, an apparatus for dynamic backlight-control of an electronic device is provided. The apparatus includes a battery power-level detection unit and a controlling unit. The battery power-level detection unit is used for detecting the power level of a battery in the electronic device. The controlling unit is coupled to a backlight unit of a display device in the electronic device and the battery power-level detection unit for adjusting the illumination of the backlight unit according to the power level of the battery and an image-content lightness of an image inputted into the display device. The controlling unit determines maximum and minimum illuminations of the backlight unit according to the detected power level of the battery, and the controlling unit adjusts the illumination for different image-content lightness from the maximum illumination to the minimum illumination according to the detected power level. The range of the maximum and minimum illuminations of the backlight unit according to the power level of the battery overlaps with a range of maximum and minimum illuminations of the backlight unit according to the power level of a battery adjacent the battery whose power level is detected.

The invention will become apparent from the following detailed description of the preferred but non-limiting embodiments. The following description is made with reference to the accompanying drawings.

DETAILED DESCRIPTION OF THE INVENTION

Figure 1:
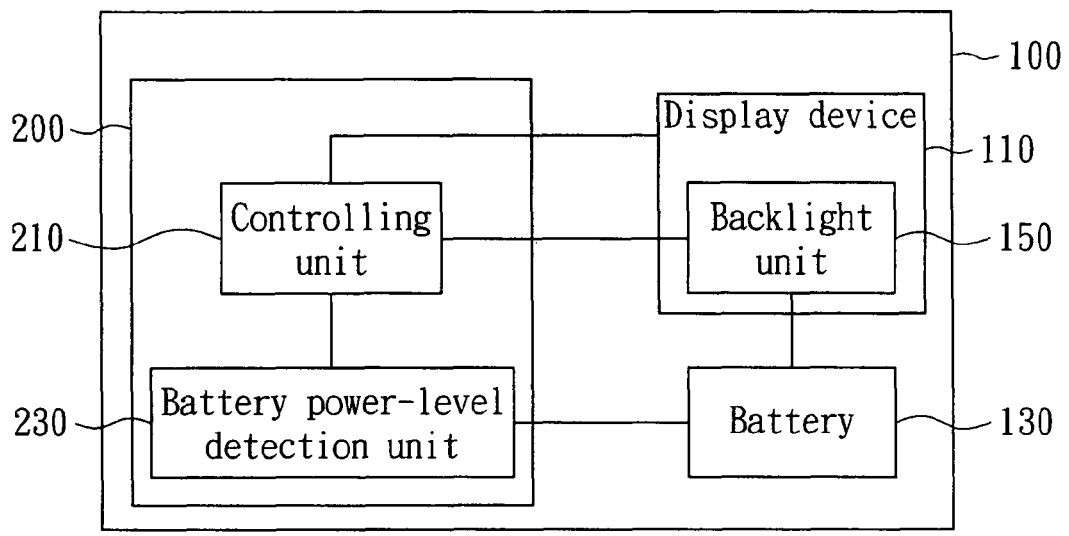
FIG. 1 is a block diagram of an electronic device having an apparatus for dynamic backlight-control according to an embodiment of the invention.

Referring to FIG. 1, a block diagram of an electronic device having an apparatus for dynamic backlight-control according to an embodiment of the invention is shown. The electronic device 100 includes a display device 110 and a battery 130. The display device 110 has a backlight unit 150 that is coupled to the battery 130. The apparatus 200 for dynamic backlight-control of the electronic device 100 includes a controlling unit 210 and a battery power-level detection unit 230. The battery power-level detection unit 230 is coupled to the battery 130 for detecting the power level of the battery 130 in the electronic device 100. The controlling unit 210 is coupled to the battery power-level detection unit 230 and to the backlight unit 150 for adjusting the illumination of the backlight unit 150 according to the power level of the battery 130 and an image that is inputted into the display device 110.

Figure 2:
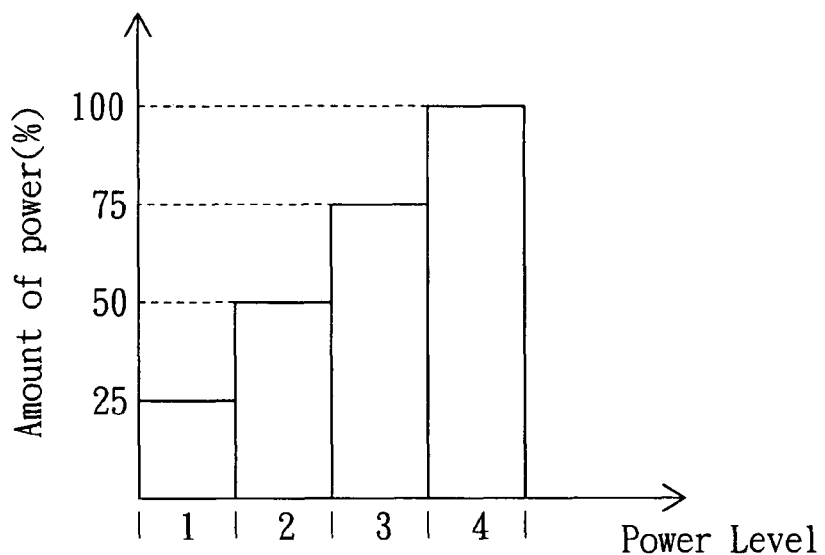
FIG. 2 is a diagram showing different power levels in the battery of FIG. 1.

By the use of the battery power-lever detection unit 230, it is possible to detect the level of the power stored in the battery 130. The amount of power of the battery 130 can be divided into different power levels. For example, the amount of power of the battery 130 can be divided into 4 different levels. Referring to FIG. 2, it is a diagram showing different power levels for the battery of FIG. 1. If the remaining amount of power is higher than or equal to three quarters of full amount of power, the power level of the battery 130 is classified to level 4. As the remaining amount of power is less than three quarters but greater than two quarters of the full amount of power, it is classified to level 3. If the remaining amount of power is between a quarter and two quarters of the full amount of power, it is classified to level 2; otherwise, it will be classified to level 1.

Figure 3:
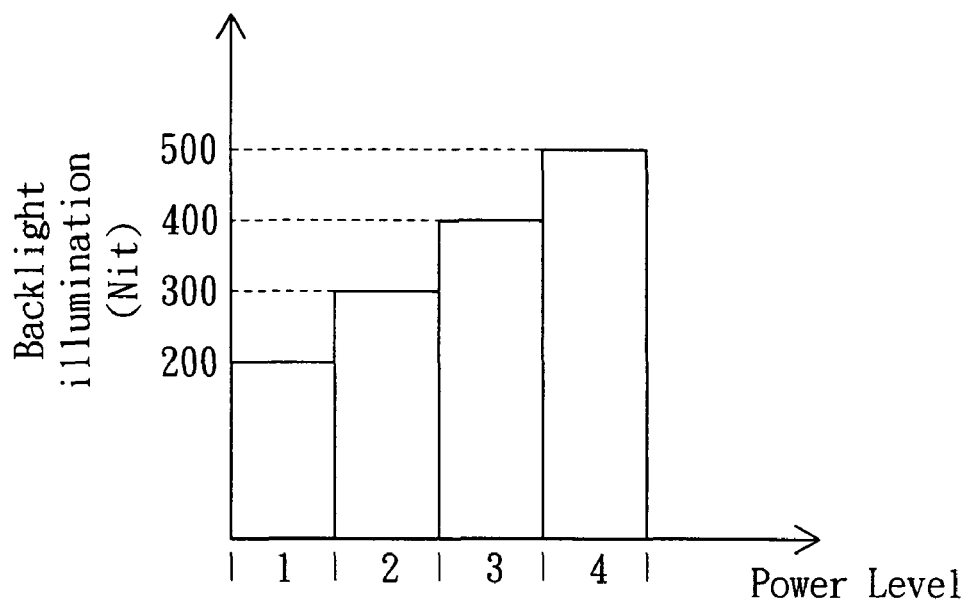
FIG. 3 is a bar chart showing the relation between the backlight illuminations and the power levels of the backlight unit of FIG. 1.

The illumination of the backlight unit 150 can be adjusted according to the power level of the battery 130. When the battery 130 has large amount of power, it is capable of providing high energy to the backlight unit 150. Preferably, as the amount of power in the battery 130 goes low, the illumination of the backlight unit 150 is lowered to reduce the power consumption of the backlight unit 150. The maximum and the minimum of the illumination of the backlight unit 150 can be determined according to the power level of the battery 130. Referring to FIG. 3, it is a bar chart showing the relation between the backlight illuminations and the power levels of the backlight unit of FIG. 1. As indicated in FIG. 3, in accordance with the 4 power levels of the battery 130, the backlight unit 150 is capable of switching its illumination among 4 different levels of illumination. For example, as the power level of the battery 130 is in the highest level 4, the illumination of the backlight unit 150 is set to 500 Nit. If the power level of the battery 130 is in level 3, the illumination of the backlight unit 150 is set to 400 Nit. When the power level of the battery 130 is in level 2, the illumination of the backlight unit 150 is set to 300 Nit. Otherwise, the illumination of the backlight unit 150 will be set to 200 Nit.

Each pixel in the image inputted into the display device 110 has its own gray level that is between 0 and 255. An image-content lightness of the image can be obtained according to the grey level of all of the pixels in the image. For example, the image-content lightness of the image is the average value of the grey levels of all pixels in the image. The image with higher image-content lightness is brighter than the image with lower image-content lightness. In this embodiment, images with different image-content lightness are displayed with different backlight illuminations. Therefore, the illumination of the backlight unit 150 can be further adjusted based on the image-content lightness of the image. When the image-content lightness is decreased, the illumination of the backlight unit 150 is decreased so as to save the power of the battery 130.

It is noted that when an image of lower image-content lightness is displayed, light from the backlight unit 150 is almost blocked by a LCD panel (not shown in the figure) of the electronic device 100. Therefore, the quality of the image will not be greatly reduced when the image of lower image-content lightness is displayed by using lower backlight illumination. By setting the backlight unit 150 to be of lower illumination when displaying the image of lower image-content lightness, the power consuming of the battery 130 is effectively reduced. Take pulse width modulation (PWM) control for example, the illumination of the backlight unit 150 can be controlled by adjusting the duty ratio of the control signal for the backlight unit 150.

Figure 4:
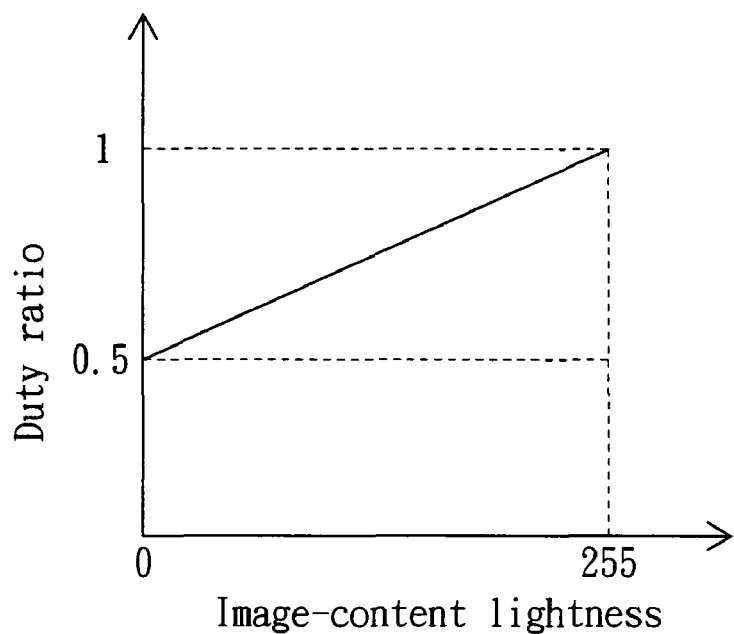
FIG. 4 is a diagram showing the relation between the duty ratio of the control signal for the backlight unit and the image-content lightness.

Referring to FIG. 4, it is a diagram showing the relation between the duty ratio of the control signal for the backlight unit and the image-content lightness. As indicated in FIG. 4, the image-content lightness is from 0 to 255, and the duty ratio of the control signal (for example, a PWM signal) for the backlight unit 150 is between 0.5 and 1. When the image of higher image-content lightness is displayed, the higher duty ratio of the control signal for the backlight unit 150 is used. On the contrary, if the image has lower image-content lightness, the lower duty ratio is used. The relation between the duty ratio of the control signal for the backlight unit 150 and the image-content lightness can be designed in accordance with the actual requirement.

Therefore, besides the power lever of the battery 130, the duty ratio of the control signal for the backlight unit 150 can also be determined by the image-content lightness. Considering the power lever of the battery 130 and the image-content lightness at the same time, the duty ratio of the control signal for the backlight unit 150 varies depending on different situations.

Figure 5:
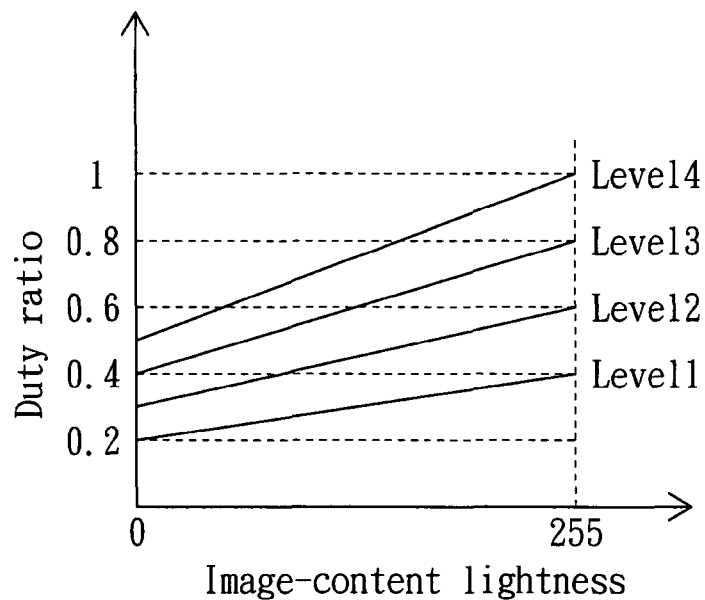
FIG. 5 is a diagram showing different duty ratio curves for different power levels.

For example, the illumination of the backlight unit 150 can be determined by combining the duty ratio of the control signal for the backlight unit 150 with the image-content lightness of the image in different power level. Referring to FIG. 5, it is a diagram showing different duty ratio curves for different power levels. As indicated in FIG. 5, when the power level of the battery 130 is in the highest level 4, a duty ratio curve having the maximum slope of the backlight unit 150 is taken. In the situation, the duty ratio of the control signal for the backlight unit 150 is 0.5 as the image-content lightness is 0, and the duty ratio is 1 as the image-content lightness is 255. When the power of the battery 130 is in the lowest level 1, a duty ratio curve having the minimum slope is considered. In this situation, the duty ratio of the control signal for the backlight unit 150 is 0.2 with the lowest image-content lightness, and the duty ratio is 0.4 with the highest image-content lightness.

Figure 6:
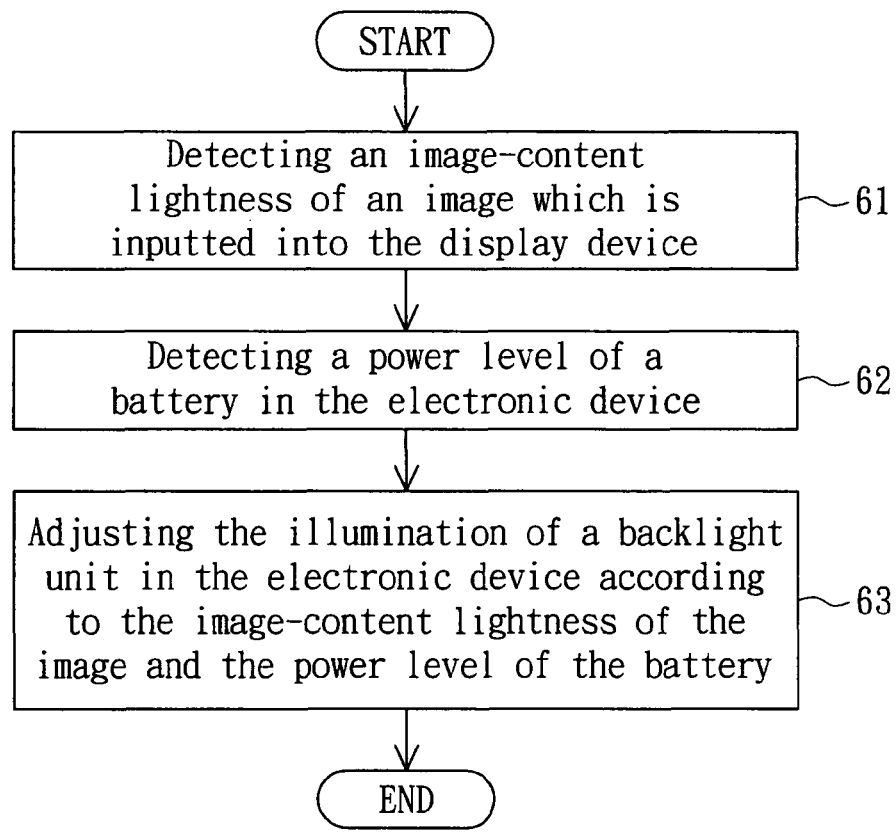
FIG. 6 is a flowchart showing the process of dynamic backlight control in the electronic device of FIG. 1.

A method for dynamic backlight-control of the display device 110 in the electronic device 100 is provided. Referring to FIG. 6, a flowchart showing the process of dynamic backlight-control in the electronic device of FIG. 1 is shown. The method includes the steps 61–63: detecting an image-content lightness of an image which is inputted into the display device 110 in step 61; detecting the power level of the battery 130 in the electronic device 100 in step 62; and adjusting the illumination of the backlight unit 150 in the electronic device 100 according to the image-content lightness of the image and the power level of the battery 130 in step 63.

In step 61, as shown in FIG. 1, when the image is inputted into the display device 110, the image-content lightness that ranges from 0 to 255 of the image is obtained by the controlling unit 210. With the different image-content lightness, the controlling unit 210 has a predetermined duty ratio of the control signal for the backlight unit 150. The predetermined duty ratio curve is shown in FIG. 4 for example.

In step 62, the battery power-level detection unit 230 coupled to the battery 130 is capable of detecting the amount of power in the battery 130. The controlling unit 210 coupled to the battery power-level detection unit 230 is therefore able to obtain the information about the battery 130. According to the power level of the battery 130, the controlling unit 210 can determine the maximum and the minimum of the illumination of the backlight unit 150. The illuminations of the backlight unit 150 under different power level conditions of the battery 130 are shown in FIG. 3 for example.

As the controlling unit 210 receives the information about the image-content lightness of the image and the power level of the battery 130, the process for dynamic backlight-control of the electronic device 100 can proceed to step 63. In step 63, the controlling unit 210 will adjust the illumination of the backlight unit 150 according to the power lever of the battery 130 and the image-content lightness of the image. When the amount of power of the battery 130 is in level 2 for example, the illumination of the backlight unit 150 is between 0 and 300 Nit as indicated in FIG. 3. With the predetermined duty ratio for the backlight unit 150 and regarding the different image-content lightness, the controlling unit 210 will adjust the backlight unit 150 to regulate the duty ratio of the control signal for the backlight unit 150 from 0.3 to 0.6 as shown in FIG. 5. Therefore, the power consumption of the backlight unit 150 is reduced.

With the implement of the battery power-level detection unit 230, the amount of power of the battery 130 in the electronic device 100 is detected easily and the controlling unit 210 will automatically adjust the illumination of the backlight unit 150 according to the power level of the battery 130. When the battery 130 has full amount of power, the backlight unit 150 is able to provide the highest illumination to the display device 110. As the amount of power of the battery 130 is decreased, the illumination of the backlight unit 150 is adjusted so as to lower the power consumption and save the power of the battery 130. Besides, considering the image-content lightness of the image displayed in the display device 110, the battery 130 accordingly further adjusts the amount of the power to the backlight unit 150 so as to further reduce the power consumption when displaying the image without much image quality decreased By the use of dynamic backlight control of a display device, the operating time of the battery is prolonged. Therefore, when the battery is in low power mode, the user can still complete some urgent tasks.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for dynamic backlight control of a display device in an electronic device, comprising:
    detecting an image-content lightness of an image which is inputted into the display device;
    detecting a power level of a battery in the electronic device; and
    adjusting the illumination of a backlight unit in the electronic device according to the image-content lightness of the image and the detected power level of the battery, wherein the adjusting step includes
        determining the maximum and minimum illuminations of the backlight unit according to the detected power level of the battery, and
        determining the illumination, which is between the maximum and minimum illumination according to the detected power level of the battery, for different image-content lightness;
    wherein the range of the maximum and minimum illuminations of the backlight unit according to the detected power level overlaps with a range of maximum and minimum illuminations of the backlight unit according to a power level adjacent the detected power level.

2. The method according to claim 1, further comprising decreasing the illumination of the backlight unit as the image-content lightness of the image decreases.

3. The method according to claim 1, further comprising decreasing the illumination of the backlight unit as the detected power level decreases.

4. The method according to claim 1, wherein the image-content lightness of the image is between 0 and 255, when the image-content lightness of a pixel in the image is higher, and the illumination of the backlight unit for showing the pixel is larger.

5. An apparatus for dynamic backlight-control of an electronic device, comprising:
    a battery power-level detection unit for detecting the power level of a battery in the electronic device; and
    a controlling unit coupled to a backlight unit of a display device in the electronic device and the battery power-level detection unit and adjusting the illumination of the backlight unit according to the detected power level of the battery and an image-content lightness of an image inputted into the display device,
    wherein the controlling unit determines maximum and minimum illuminations of the backlight unit according to the detected power level, and the controlling unit adjusts the illumination for different image-content lightness from the maximum illumination to the minimum illumination according to the detected power level, and
    wherein the range of the maximum and minimum illuminations of the backlight unit according to the detected power level overlaps with a range of maximum and minimum illuminations of the backlight unit according to a power level adjacent the detected power level.

6. The apparatus according to claim 5, wherein the controlling unit decreases the illumination of the backlight unit as the image-content lightness of the image decreases.

7. The apparatus according to claim 5, wherein the controlling unit decreases the illumination of the backlight unit as the detected power level decreases.

8. The apparatus according to claim 5, wherein the image-content lightness of the image, which is shown on the display device, is between 0 and 255, when the image-content lightness of a pixel in the image is higher, the illumination of the backlight unit for showing the pixel is larger.

* * * * *